US007597738B2

(12) United States Patent
Liu et al.

(10) Patent No.: US 7,597,738 B2
(45) Date of Patent: *Oct. 6, 2009

(54) PRODUCTION OF FERRO-NICKEL OR NICKEL MATTE BY A COMBINED HYDROMETALLURGICAL AND PYROMETALLURGICAL PROCESS

(75) Inventors: Houyuan Liu, Shortland (AU); Alexey Duarte, Perth (AU); Wolf Meihack, Brisbane (AU); Ivan P. Ratchev, Jesmond (AU)

(73) Assignee: BHP Billiton SSM Technology Pty Ltd., Perth (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/687,256

(22) Filed: Mar. 16, 2007

(65) Prior Publication Data
US 2008/0016986 A1  Jan. 24, 2008

Related U.S. Application Data

(63) Continuation of application No. PCT/AU2005/001360, filed on Sep. 14, 2005.

(30) Foreign Application Priority Data
Sep. 17, 2004 (AU) ............................... 2004905392

(51) Int. Cl.
C22B 23/00 (2006.01)
C22B 3/42 (2006.01)
(52) U.S. Cl. .................... 75/416; 75/724; 420/590; 205/589; 205/596
(58) Field of Classification Search .................. 75/724, 75/416; 420/590; 205/589, 596
See application file for complete search history.

(56) References Cited

U.S. PATENT DOCUMENTS

| 5,443,619 | A  | * | 8/1995  | McDoulett et al. | ............ 75/421  |
| 6,350,420 | B1 | * | 2/2002  | Duyvesteyn et al. | ........ 423/139 |
| 6,387,239 | B1 |   | 5/2002  | Duyvesteyn et al. |                     |
| 6,451,088 | B1 | * | 9/2002  | Marsden et al.   | ............... 75/739 |
| 6,485,542 | B2 | * | 11/2002 | Shindo et al.    | .................. 75/743 |
| 6,514,414 | B1 | * | 2/2003  | Martin           | ....................... 210/670 |

(Continued)

FOREIGN PATENT DOCUMENTS

CA  2378721  9/2003

(Continued)

Primary Examiner—George Wyszomierski
Assistant Examiner—Tima M McGuthry-Banks
(74) Attorney, Agent, or Firm—Brinks Hofer Gilson & Lione; G. Peter Nichols

(57) ABSTRACT

A process for the production of ferro-nickel or nickel matte from a product liquor solution containing at least nickel, cobalt, iron and acid soluble impurities, said process including the steps of: (a) contacting the product liquor solution (7) containing the nickel, cobalt, iron and acid soluble impurities with an ion exchange resin (8), wherein the resin selectively absorbs nickel and iron from the solution leaving the cobalt and the acid soluble impurities in the raffinate (9); (b) stripping the nickel and iron from the resin with a sulfuric acid solution to produce an eluate (11) containing nickel and iron; (c) neutralising the eluate to precipitate a mixed nickel iron hydroxide product (13); and (d) reducing and smelting the mixed nickel iron hydroxide product to produce ferro-nickel (29) or nickel matte (24).

31 Claims, 16 Drawing Sheets

U.S. PATENT DOCUMENTS

| | | | |
|---|---|---|---|
| 7,157,530 B2 * | 1/2007 | Matyjaszewski et al. | 526/68 |
| 2001/0001650 A1 * | 5/2001 | Duyvesteyn et al. | 423/139 |
| 2002/0041840 A1 | 4/2002 | Arroyo et al. | |

FOREIGN PATENT DOCUMENTS

| | | | |
|---|---|---|---|
| GB | 2291869 A * | 2/1996 | |
| GB | 2291870 A * | 2/1996 | |
| WO | WO 02/08477 | 1/2002 | |
| WO | WO 2004/067787 | 8/2004 | |

\* cited by examiner

PRODUCTION OF FERRO-NICKEL OR NICKEL MATTE BY A COMBINED HYDROMETALLURGICAL AND PYROMETALLURGICAL PROCESS

This application is a continuation of and claims priority to PCT application PCT/AU2005/001360 filed on Sep. 14, 2005 published in English on Mar. 23, 2006 as WO 2006/029443 and to Australian application no. 2004905392 filed Sep. 17, 2004, the entire contents of each are incorporated herein by reference.

FIELD OF THE INVENTION

In general, the present invention relates to a new method for producing ferro-nickel or nickel matte from lateritic ore by a combination of hydrometallurgical and pyrometallurgical processes. In a preferred embodiment, the present invention provides a new process which involves heap leaching of the ore, followed by nickel and cobalt recovery and impurity removal by an ion exchange process, mixed nickel and iron hydroxide production by neutralisation, followed by smelting and reduction of the mixed nickel and iron hydroxide product to produce ferro-nickel or nickel matte. Cobalt may also be recovered following a further ion exchange process by precipitation as cobalt hydroxide or cobalt sulfide.

BACKGROUND OF THE INVENTION

Laterite nickel and cobalt ore deposits generally contain oxidic type ores, limonites, and silicate type ores, saprolites, as two layers in the same deposits, separated by a transition zone. To minimise the equipment size for processing either the saprolites or the limonites by commercial processes, high grade limonite and saprolite are preferred. This leads to many ore bodies and transition ores in some deposits being rejected for current process routes.

The higher nickel content saprolites tend to be treated by a pyrometallurgical process involving roasting and electrical smelting techniques to produce ferro-nickel. The power requirements and high iron to nickel ore ratio for the lower nickel content limonite, saprolite, and limonite/saprolite blends in the transition zone make this processing route too expensive.

The high nickel and cobalt content limonite is normally commercially treated hydrometallurgically by the High Pressure Acid Leach (HPAL) process, or by a combination of pyrometallurgical and hydrometallurgical processes, such as the Caron reduction roast—ammonium carbonate leach process.

The above processes generally requires "whole ore" processing as there is no effective method to beneficiate the ore. This has the disadvantage that the mineralogical fractions of the ore which may contain lower metal values effectively dilute the total treated ore quality and increase recovery costs.

The conventional treatment of saprolite to produce ferro-nickel, involves a drying step, followed by a reduction roast step to partially convert the nickel oxides to nickel, and smelting in an electrical furnace. This is a highly energy intensive process and requires a high grade saprolite source to make it economic. It also has the disadvantage that financial value of any cobalt in the ore, which is recovered into the ferro-nickel, is not realised. An improvement to this process would be to provide a nickel iron concentrate to the smelting step which would lead to a large reduction in the power consumption, which is one of the major costs of the process.

Heap leaching is a conventional method of economically extracting metals from ores and has been successfully used to recover materials such as copper, gold, uranium and silver. Generally it involves piling raw ore directly from ore deposits into heaps that vary in height. The leaching solution is introduced onto the top of the heap to percolate down through the heap. The effluent liquor is drained from the base of the heap and passes to a processing plant where the metal values are recovered.

Heap leaching of laterites is taught in U.S. Pat. No. 5,571,308 (BHP Minerals International, Inc), which describes a process for heap leaching of high magnesium containing laterite ore such as saprolite.

U.S. Pat. No. 6,312,500 (BHP Minerals International, Inc) also describes a process for heap leaching of laterites to recover nickel, which is particularly effective for ores that have a significant clay component (greater than 10% by weight).

A major problem with the heap leach process is that the leachate produced contains, in addition to the nickel and cobalt values targeted, large quantities of iron and a variety of other impurities. The purification of similar nickel solutions from commercial laterite acid leach processes involve neutralisation of the acid content, precipitation of iron, followed by production of a nickel cobalt intermediate, a re-dissolution step, and complex solvent extraction stages to produce saleable nickel and cobalt. The purification steps generally aim for complete removal of iron and the other impurities.

Ion Exchange (IX) processes have been disclosed for the extraction of both the nickel and cobalt from the nickel leachate, leaving the major impurities in the raffinate.

U.S. Pat. No. 9,516,118 (BHP Minerals International Inc.) describes an ion exchange process for separating nickel from the leachate from treatment of laterite by the pressure acid leach process. Nickel is extracted by the resin at pH less than 2, and stripped with sulfuric acid for subsequent electrowinning. Cobalt remains in the raffinate along with other impurities, and after solution neutralisation is precipitated as a sulfide.

Patent WO 00/053820 (BHP Minerals International Inc.) describes the ion exchange extraction of nickel and cobalt from acid sulfate leach solution onto the resin, and the subsequent acid stripping of the metals from the resin, and their separation by solvent extraction.

U.S. Pat. No. 6,350,420 B1 (BHP Minerals International Inc.) also teaches the use of ion exchange resin in a resin in pulp process to extract nickel and cobalt onto the resin from an acid leach slurry.

The above patents all aim to produce relatively pure nickel solution, or nickel and cobalt strip solutions from the ion exchange resins.

The above discussion of documents, articles and the like is included in the specification solely for the purpose of providing a context for the present invention. It is not suggested or represented that any or all of these matters formed part of the prior art base or were common general knowledge in the field relevant to the present invention before the priority date.

The present invention aims to provide a new process which overcomes or at least alleviates one or more of the difficulties associated with the prior art.

SUMMARY OF THE INVENTION

In general, the present invention provides a process for producing ferro-nickel or nickel matte, and cobalt-containing hydroxide or sulfide from laterite ore. It is applicable to the entire profile of laterite ore bodies. The invention is particularly applicable to a process where the laterite ore has been subjected to a heap leach process, wherein the nickel and cobalt is leached with sulfuric acid to form a product liquor solution containing nickel, cobalt, iron and acid soluble impurities.

In a particular embodiment, the invention resides in a process for the production of ferro-nickel or nickel matte from a product liquor solution containing at least nickel, cobalt, iron and acid soluble impurities, said process including the steps of:
  a. contacting the product liquor solution containing the nickel, cobalt, iron and acid soluble impurities with an ion exchange resin, wherein the resin selectively absorbs nickel and iron from the solution leaving the cobalt and the acid soluble impurities in the raffinate;
  b. stripping the nickel and iron from the resin with a sulfuric acid solution to produce an eluate containing nickel and iron;
  c. neutralising the eluate to precipitate a mixed nickel iron hydroxide product; and
  d. reducing and smelting the mixed nickel iron hydroxide product to produce ferro-nickel or nickel matte.

In general, the process forms part of an overall process for the recovery of nickel and cobalt. Preferably, the product liquor solution is produced by a heap leach process wherein at least one heap of ore is established and leached with a sulfuric acid supplemented liquor stream, which will percolate through the heap to produce a product liquor solution containing at least nickel, cobalt, iron and acid soluble impurities. More preferably, the heap leach process is established in a counter current system whereby:
  a. a primary and a secondary heap are established;
  b. the secondary heap is treated with a liquor stream comprising recycled raffinate from the ion exchange process supplemented by sulfuric acid, to produce an intermediate product liquor solution; and
  c. treating the primary heap with the intermediate product liquor solution to produce the product liquor solution containing at least nickel, cobalt, iron and acid soluble impurities.

Whereas it is envisaged that the product liquor solution will be produced by a heap leach process, preferably a counter current heap leach process, the ion exchange process may also be applied to a product liquor solution containing at least nickel, cobalt and iron produced from lateritic ore by leaching with sulfuric acid by other means, such as leachate, partially neutralised to pH of from about 1.0 to 2.5, from a pressure acid leach process, an atmospheric leach process, or any combination of pressure and atmospheric leaching, or from an oxidative leach process of nickel sulfide ores followed by partial neutralisation. The product liquor solution from such processes may report directly to the ion exchange step or be combined with the liquor stream in the heap leach process.

At a pH of from about 1.0 to 2.5, the ion exchange resin used in the process selectively absorbs nickel and ferric iron ions in preference to cobalt and any acid soluble impurities such as ferrous iron, manganese, magnesium and aluminium that may be present. The preferred ion exchange resin is a resin having a bis-picolylamine functional group such as Dowex M4194.

The cobalt may also be recovered by separate ion exchange processing wherein the raffinate, which by now is substantially free of nickel and ferric iron ions, is contacted with an ion exchange resin. The preferred ion exchange resin is again a resin having a bis-picolylamine functional group such as Dowex M4194. Most preferably, prior to contact with the ion exchange resin, the raffinate is partially neutralised with, for example calcium carbonate, to precipitate any remaining ferric iron as goethite, haematite or hydroxides. The partially neutralised raffinate containing the cobalt and acid soluble impurities is then contacted with the ion exchange resin at a pH of from about 2.0 to 3.0 to selectively absorb the cobalt and leave a cobalt depleted raffinate. The cobalt is then eluted from the resin with sulfuric acid and recovered from the eluate by neutralising the eluate to precipitate the cobalt as a cobalt hydroxide or cobalt sulfide product.

DETAILED DESCRIPTION OF THE EMBODIMENTS

In a preferred embodiment, where the product liquor solution results from an acid heap leach process, laterite ore is crushed to a size, preferably less than 25 mm size and agglomerated using water, sulfuric acid, or other binding materials, to improve heap permeability The agglomerated ore may be arranged into a single heap but preferably at least two heaps, a primary and a secondary heap, to be operated as a counter current heap leach system. The counter current heap leach process has the advantage of lower acid consumption, and a cleaner product solution than the single heap system.

Figure 1:
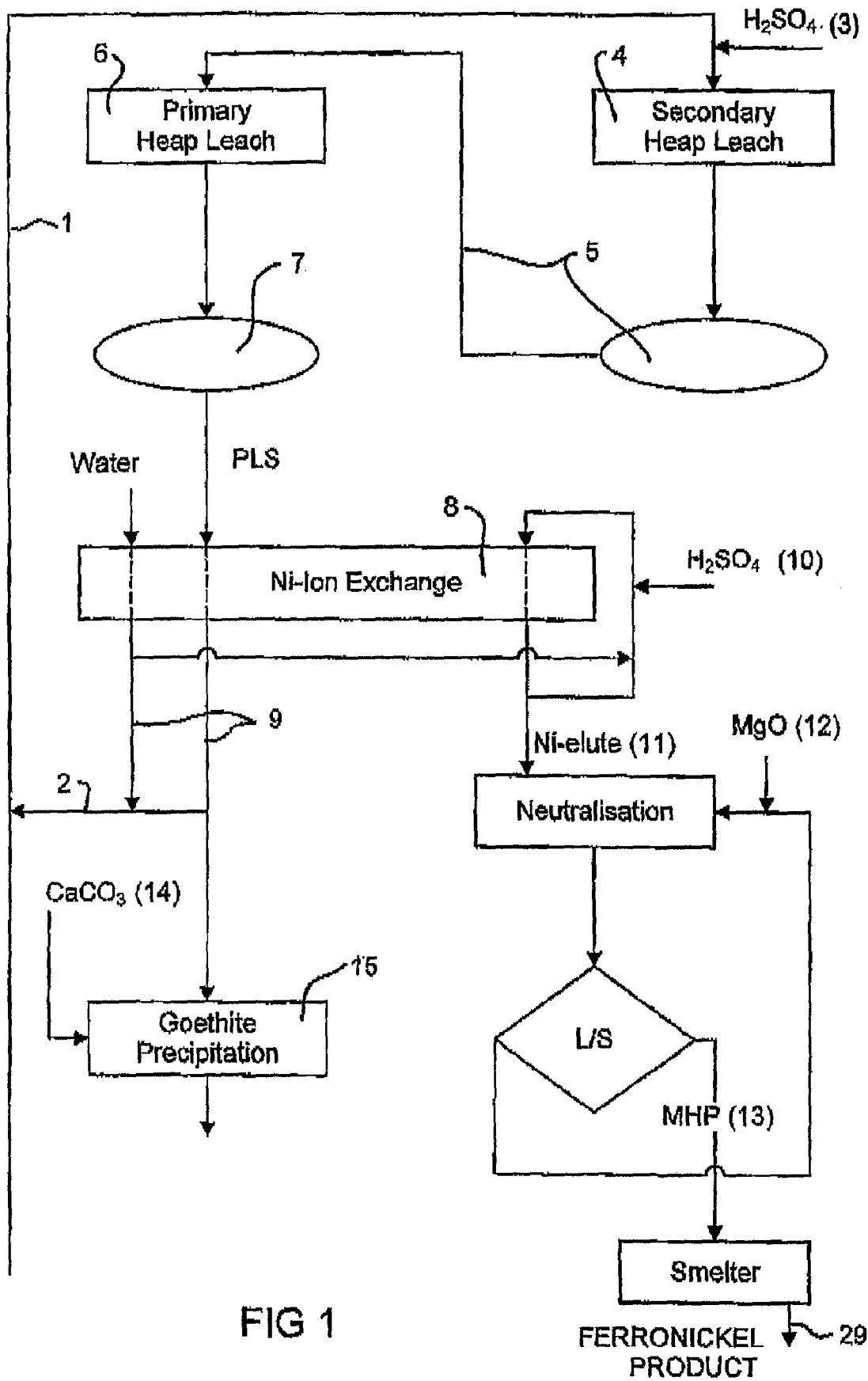
FIG. 1 illustrates a flow sheet of the invention illustrating each aspect of the invention including the counter current heap leach process, the hydrometallurgical nickel and iron ion exchange process leading to production of a ferro-nickel product by pyrometallurgical means, and the recovery of cobalt by ion-exchange and precipitation techniques.
Figure 1:
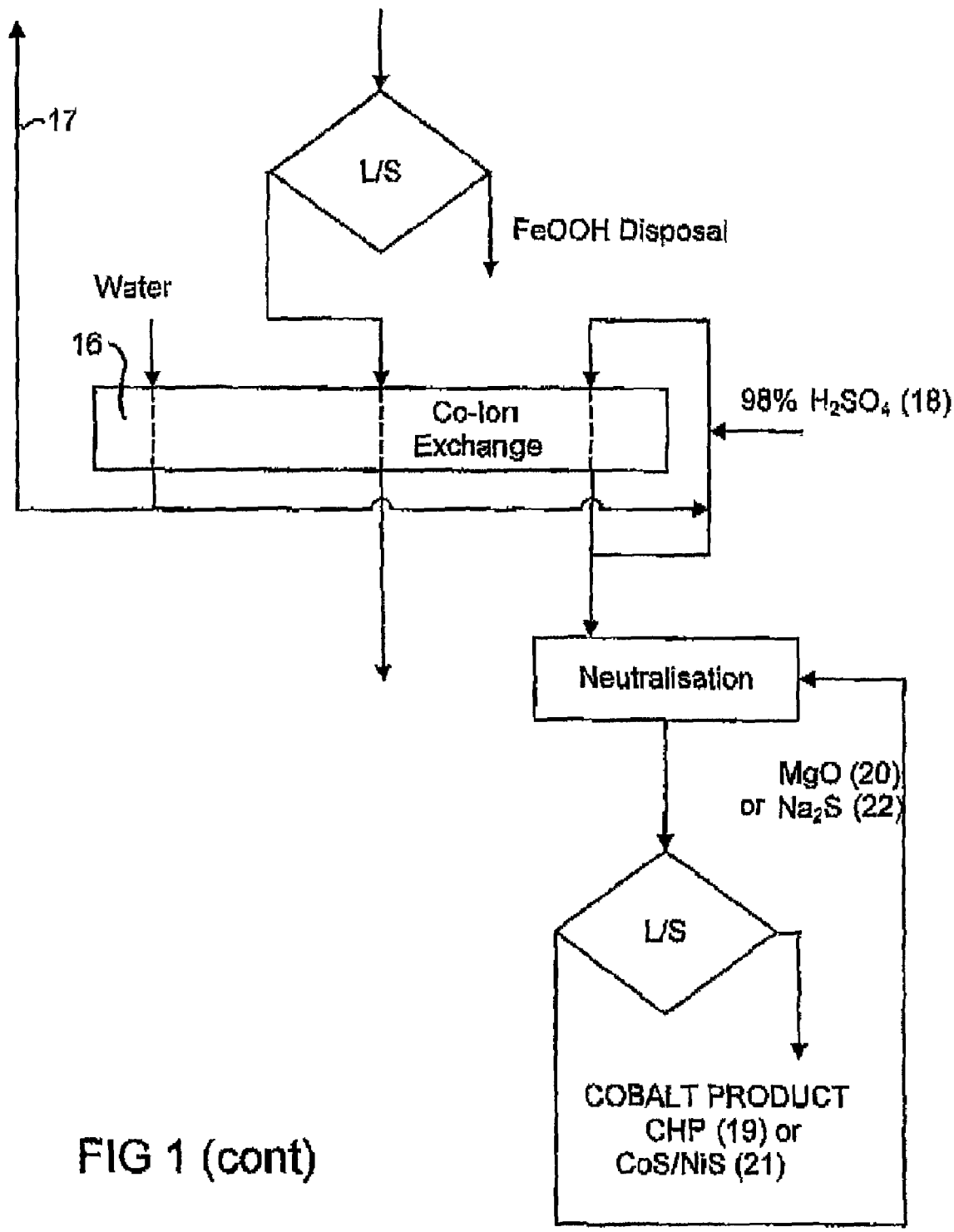

In a preferred method, which is illustrated in FIG. 1, the liquor stream (1) is sourced from the nickel depleted recycled raffinate (2) from the nickel ion exchange step (8), supplemented with sulfuric acid (3), and added to the secondary heap leach (4) producing an intermediate product liquor solution (5). This intermediate product liquor solution is then added to the primary heap leach (6) in a counter current process. This produces a nickel and cobalt rich product liquor solution (PLS) (7) with low acidity, which also contains iron and a number of other impurities. When the secondary heap is depleted of nickel, it is discarded, the primary heap becomes the secondary heap, and a new ore heap becomes the primary heap.

The product liquor solution (7) is treated by an ion exchange step (8), where the majority of the nickel and some of the iron is retained on the resin bed, and the major portion of the iron, other impurities, and the cobalt remain in the raffinate solution (9) and pass through. The resin for example, preferably is a resin with a bis-picolylamine functional group. Most preferably it is Dowex M4195. At pH 2 the absorption constants indicating selectivity of the resin are in the order is $Ni^{+2} > Fe^{+3} > Co^{+2} > Fe^{+2} > Mn^{+2} > Mg^{+2} > Al^{+3}$. Therefore the resin can recover nickel and ferric iron at a pH of from about 1.0 to 2.5 and cobalt and acid soluble impurities remain in the raffinate. The retained nickel and iron are eluted from the resin using sulfuric acid solution (10) to produce an eluate containing nickel and iron (11). Some of this eluate and some water may be recycled and added to the sulfuric acid as part of the eluting process.

Previous work carried out on nickel processing has used ion exchange systems to produce a pure nickel eluate, or an eluate containing the nickel and cobalt values. The use of the ion exchange step in this process however, is used to produce a nickel and iron mixture in the eluate suitable for further processing to ferro-nickel or nickel matte. The ratio of the nickel to iron in the eluate should be about 0.5:4 to 4:0.5, most preferably 1:1 which is a suitable ratio for the production of a ferro-nickel product. The inclusion of iron in the eluate also reduces the amount of iron to be neutralised and rejected, reducing the size of the downstream equipment.

The ion exchange eluate containing the nickel and iron (11) is neutralised, preferably with Magnesium oxide (12), to precipitate a mixed nickel iron hydroxide product (MHP) (13), which is subjected to solid/liquid separation (L/S), filtered and dried.

The mixed nickel iron hydroxide product may then be reduced, and fed to an electric arc furnace for smelting to produce a ferro-nickel product (29).

In order to dispose of the iron, the raffinate from the nickel ion exchange step may be partially neutralised, preferably using calcium carbonate (14), which precipitates the majority of the iron as goethite (15) for disposal. Precipitation of iron as goethite prevents accumulation or saturation of iron in the system, which will assist in cobalt recovery by ion exchange. The iron may also be precipitated as haematite or hydroxide.

In order to recover the cobalt, the partially neutralised raffinate, which has now been mostly depleted of both nickel and ferric iron, may then be treated in a cobalt ion exchange step (16), to extract the cobalt onto the resin leaving a cobalt depleted raffinate. The resin may again be a resin with a bis-picolylamine functional group, such as Dowex M4195. If desired, all or part of the cobalt ion exchange raffinate is acidified, preferably with sulfuric acid and recycled (17) as depleted product liquor solution to the secondary heap leach stage.

The cobalt may be eluted from the cobalt ion exchange resin with sulfuric acid (18). A small portion of the cobalt containing eluate, together with a small amount of water may be recycled through the resin bed with the sulfuric acid as part of the eluting process. The cobalt can be recovered from the eluate either as a cobalt/nickel hydroxide precipitate (CHP) (19) by neutralisation with, for example, magnesium oxide (20), or as a cobalt/nickel sulfide (21) precipitate by precipitation with, for example, a sodium sulfide solution (22) or sodium bi-sulfide.

Additionally, while it is envisaged that the secondary heap will be treated by recycled nickel depleted raffinate and also possibly with the cobalt depleted raffinate following the cobalt ion exchange process supplemented by sulfuric acid, this liquor stream may also be supplemented by leachate containing at least nickel, cobalt and iron from a pressure acid leach process, an atmospheric leach process, or any combination of pressure and atmospheric leaching of laterite ores, or from an oxidative leach process of nickel sulfide ores. In an alternative embodiment, the product liquor solution for the ion exchange process can be sourced directly from the leachate of such leach processes, without a heap leach process.

Figure 2:
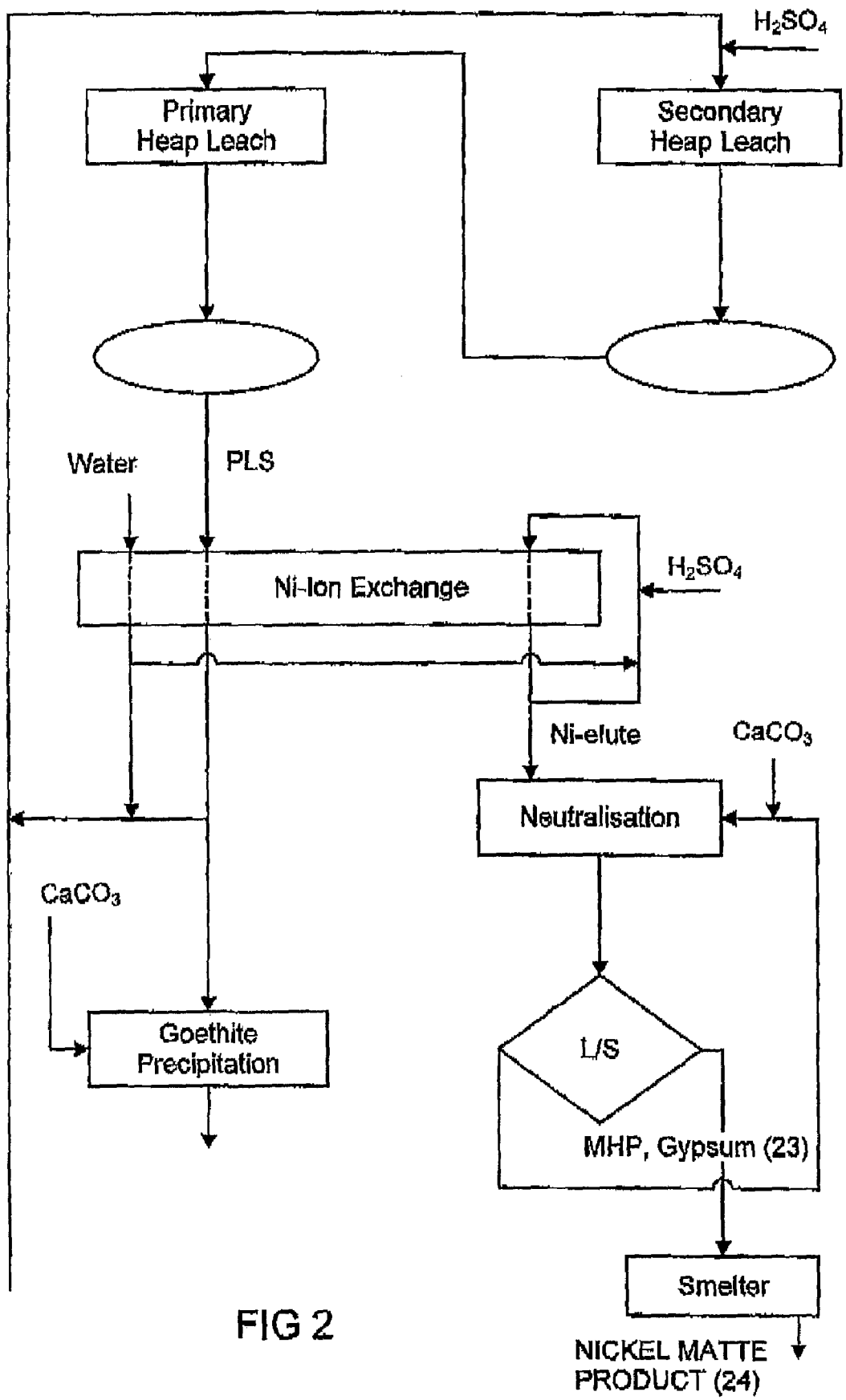
FIG. 2 illustrates the same process as FIG. 1 except for the addition of gypsum in the smelting process to produce nickel matte.
Figure 2:
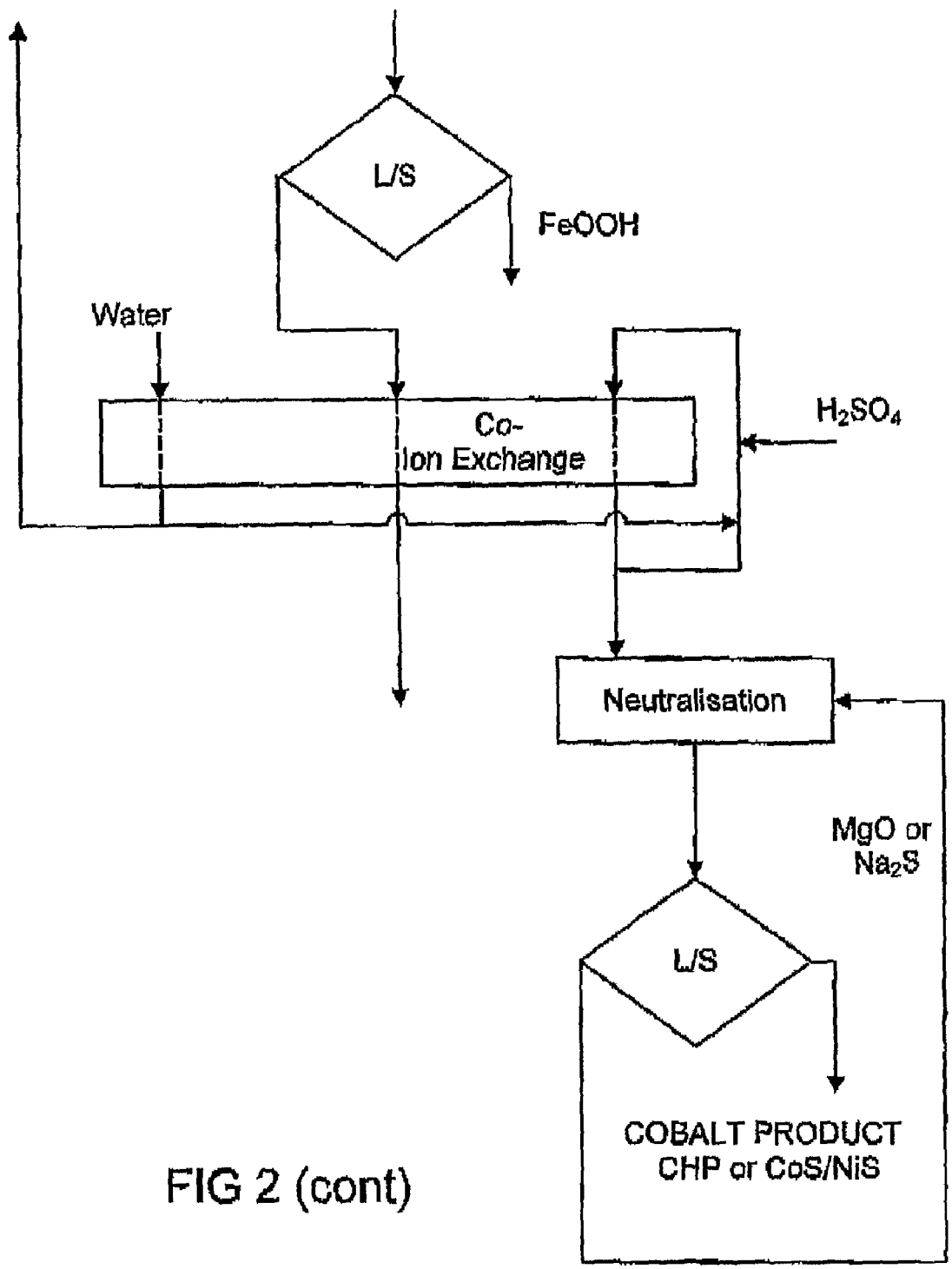

In a further embodiment of the process described in FIG. 1, FIG. 2 illustrates a process where gypsum (calcium sulfate) (23) or an alternative sulfur source, may be added to the mixed nickel iron hydroxide product, and the mixture smelted to produce nickel matte (24) (a nickel iron sulfide) which can be further processed to refined nickel.

Figure 3:
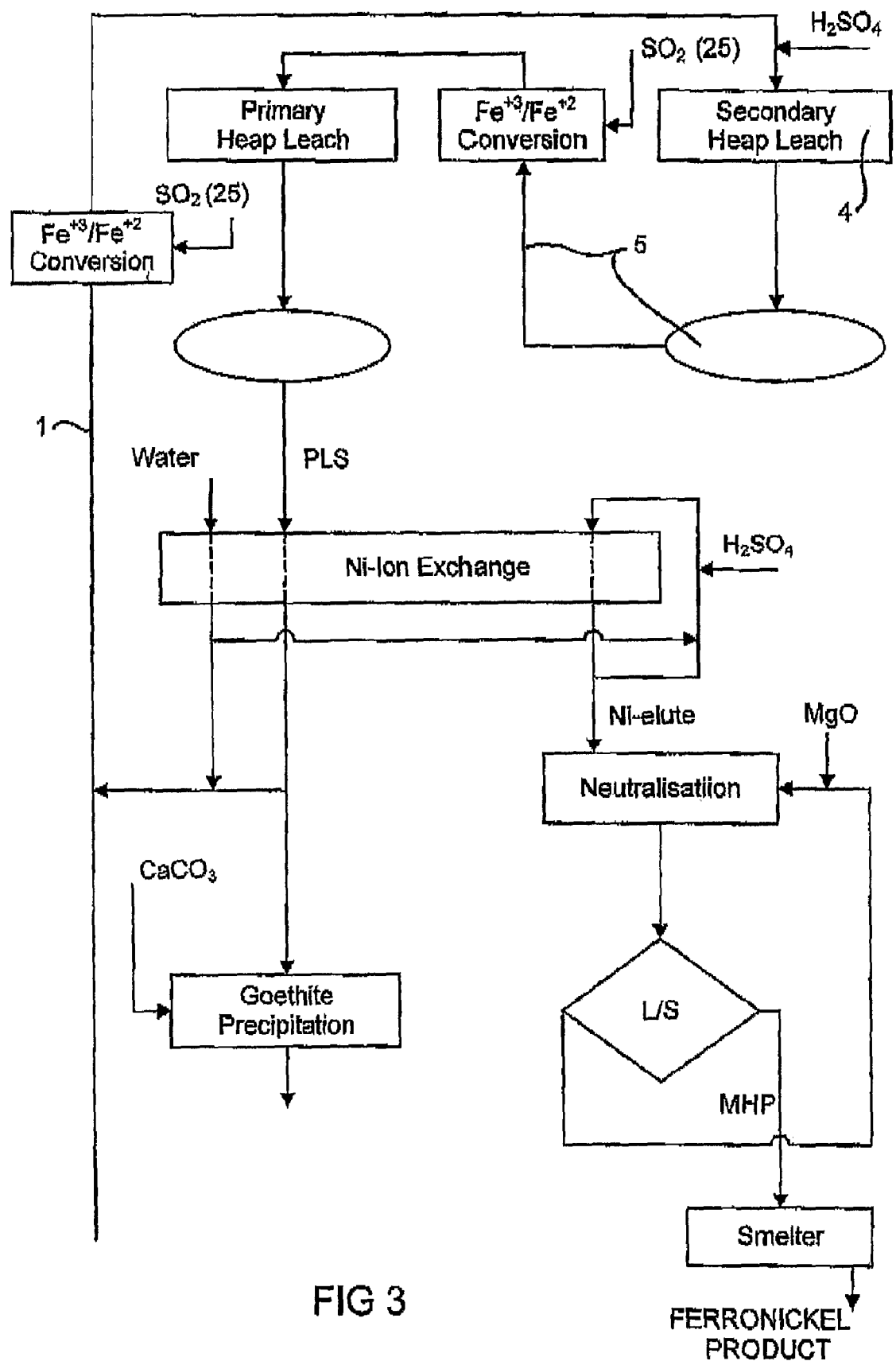
FIG. 3 illustrates the same process as FIG. 1 except for the addition of sulfur dioxide added prior to and during the leach step to convert ferric iron to ferrous iron and improve cobalt recovery.
Figure 3:
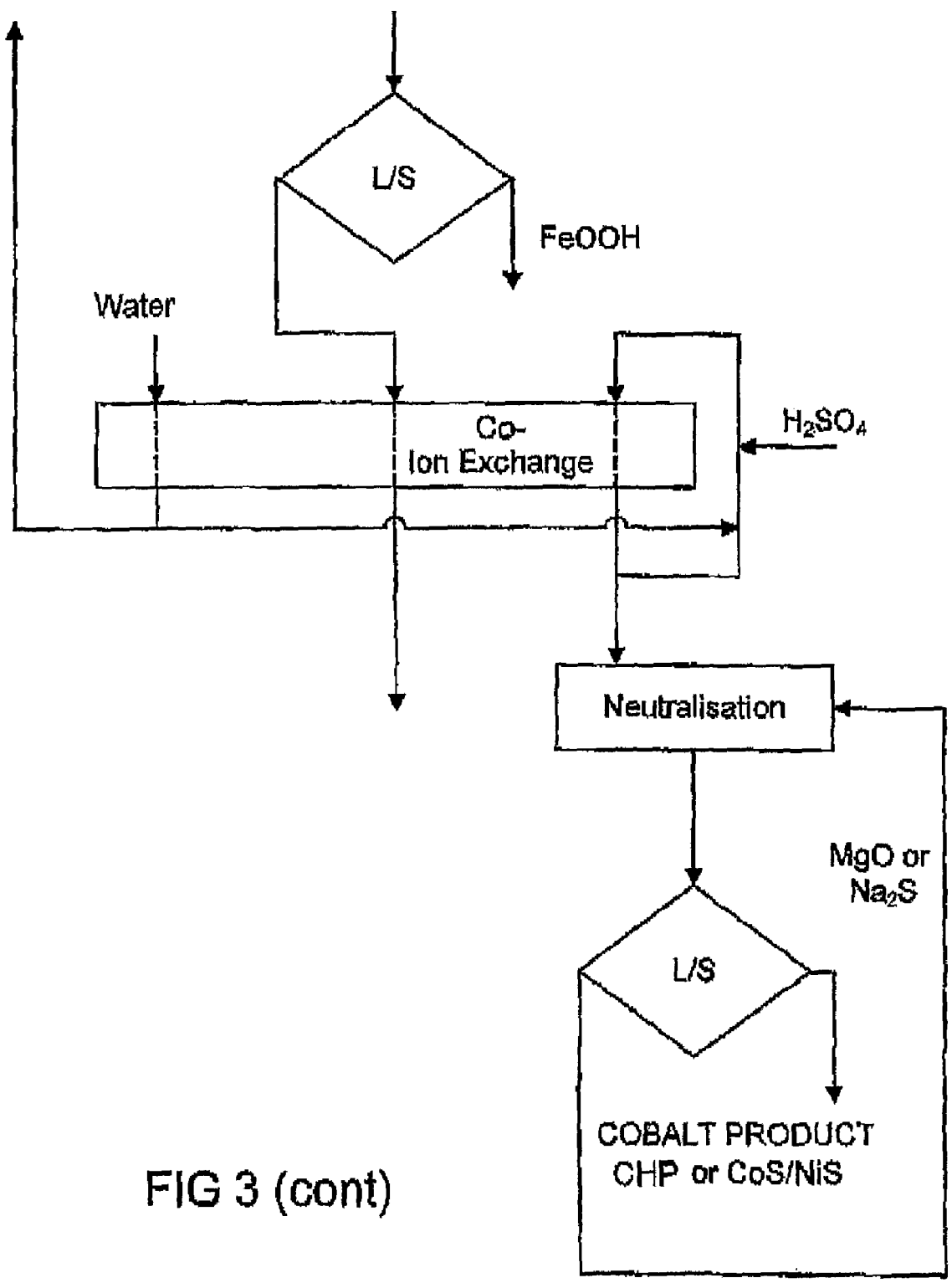

In another embodiment (FIG. 3) illustrated as applicable to the production of ferro-nickel but also applicable to the production of nickel matte, sulfur dioxide (25) may be added to the recycled depleted product liquor stream (1) and/or to the intermediate product liquor solution (5) from the secondary heap (4). This assists in the conversion of ferric iron in the solutions to ferrous iron, which contributes to the destruction of asbalane $(Mn, Co)O_2$ and liberates cobalt into solution improving its recovery. The conversion of ferric ions to ferrous ions also enhances the selectivity of the resin to nickel because most conventional resins have less selectivity to ferrous than ferric ions. In addition, the conversion of ferric ions to ferrous ions releases acid, which assists in the leaching of the ore. The sulfur dioxide may be in the form of gaseous sulfur dioxide, sodium metabisulfite, or any other form.

Figure 4:
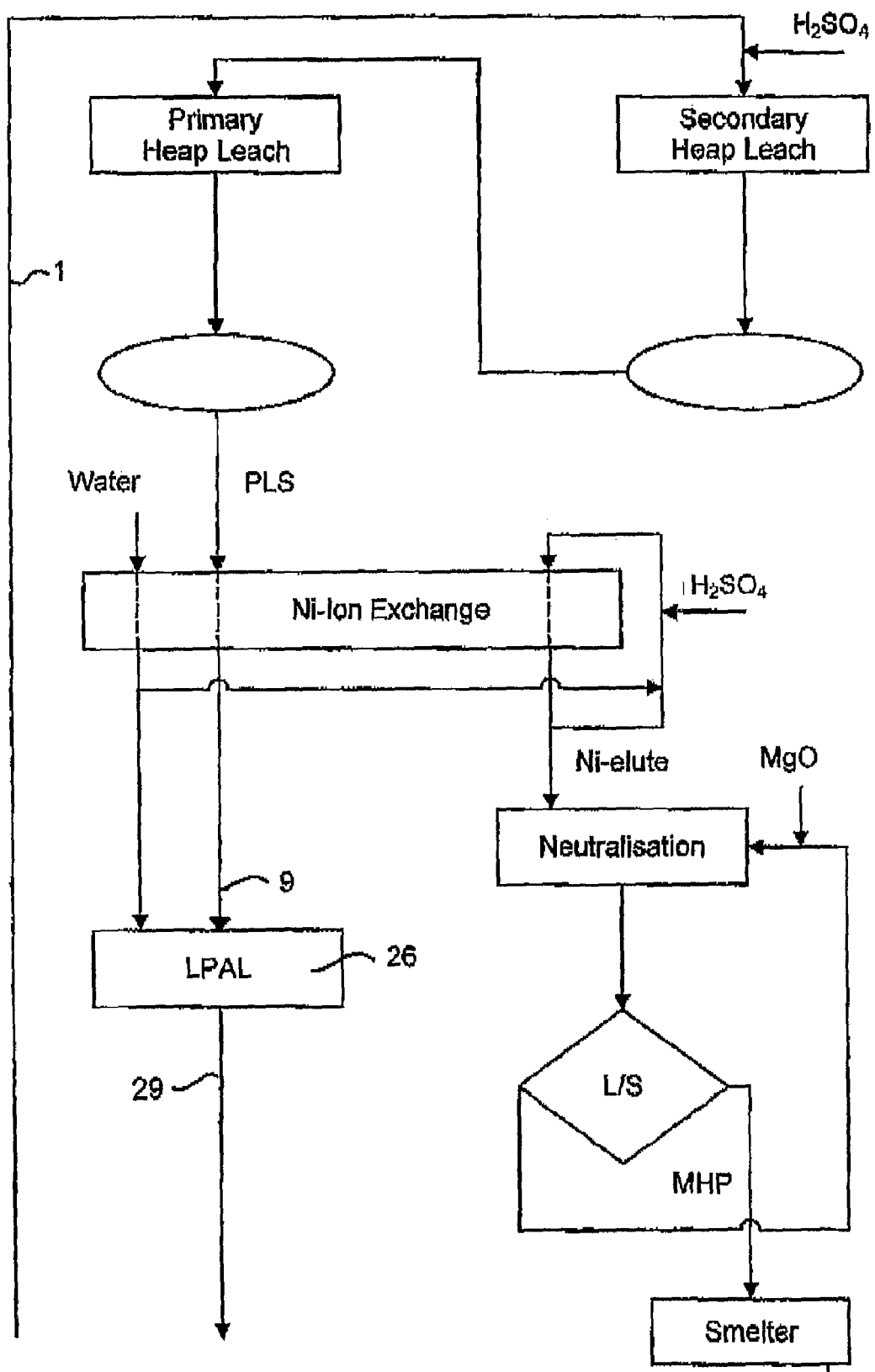
FIG. 4 illustrates the same process as FIG. 1 except for the introduction of a low pressure leach step applied to the nickel ion exchange raffinate.
Figure 4:
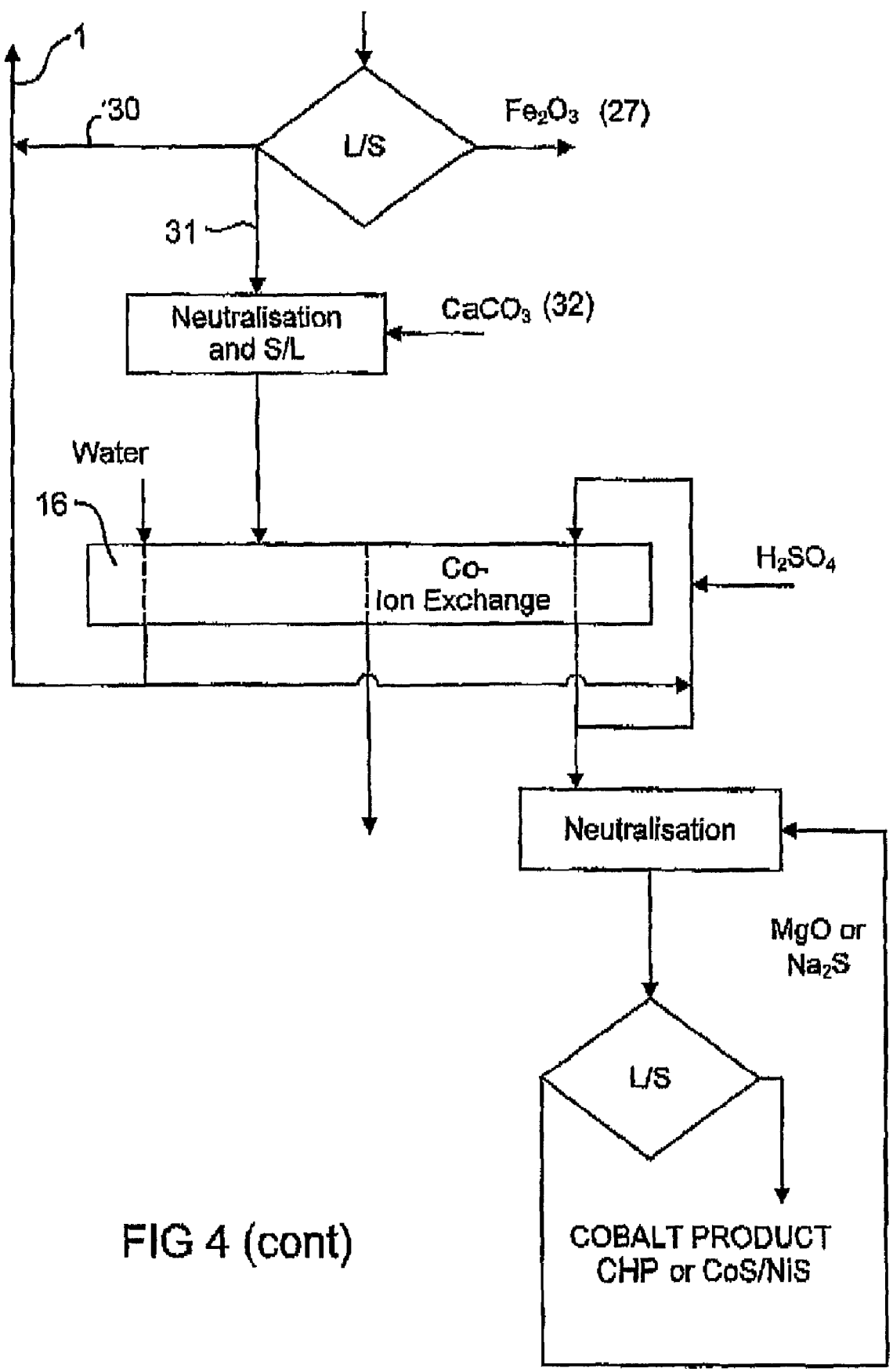

In yet a further embodiment of the invention (FIG. 4), illustrated as applicable to the production of ferro-nickel but also applicable to the production of nickel matte, the nickel depleted raffinate (9) from the ion exchange step may be subjected to a low pressure leach step (LPAL) (26) at approximately 160°-200° C., preferably about 180° C., in an autoclave. This will precipitate iron as haematite (27), which releases some acid to the recycled depleted product liquor solution (1), reducing overall acid consumption, while discharging iron from the system.

The discharge stream (29) from the LPAL step contains high acidity due to acid release caused by iron precipitation as haematite (27). The haematite is discarded following solid/liquid separation. Part of this acidic discharge stream (30) can be recycled to the liquor solution (1) for use in the heap leach process. The discharge stream (30) may be recycled several times to build up the level of cobalt to a sufficient level to recover by an ion exchange process. Once there are sufficient cobalt levels, part of the discharge stream (31) is bled off for cobalt recovery.

In order to achieve operational ion exchange for cobalt, the pH of the discharge stream (31) should be about 2-3. Therefore it is neutralised, preferably with calcium carbonate (32) to adjust the pH before the cobalt ion exchange step (16).

A further reason for the LPAL step is to discharge a part of the iron as haematite in order to keep the level of iron in balance. That is, to prevent accumulation or saturation of iron in the system. This will assist in the recovery of cobalt by ion exchange.

Figure 5:
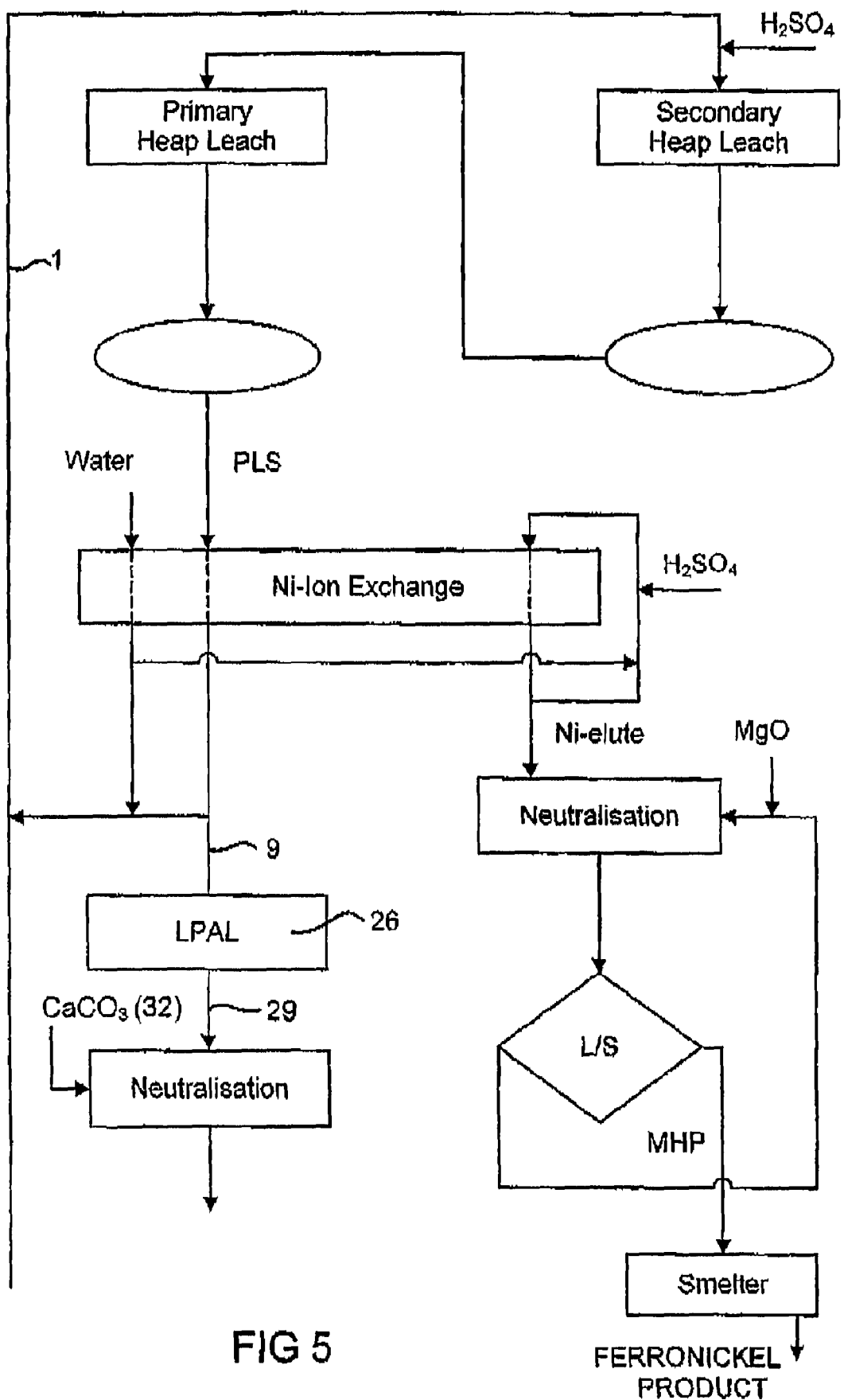
FIG. 5 illustrates the same process as FIG. 4 except that the low pressure leach step is applied to only part of the nickel ion exchange raffinate.
Figure 5:
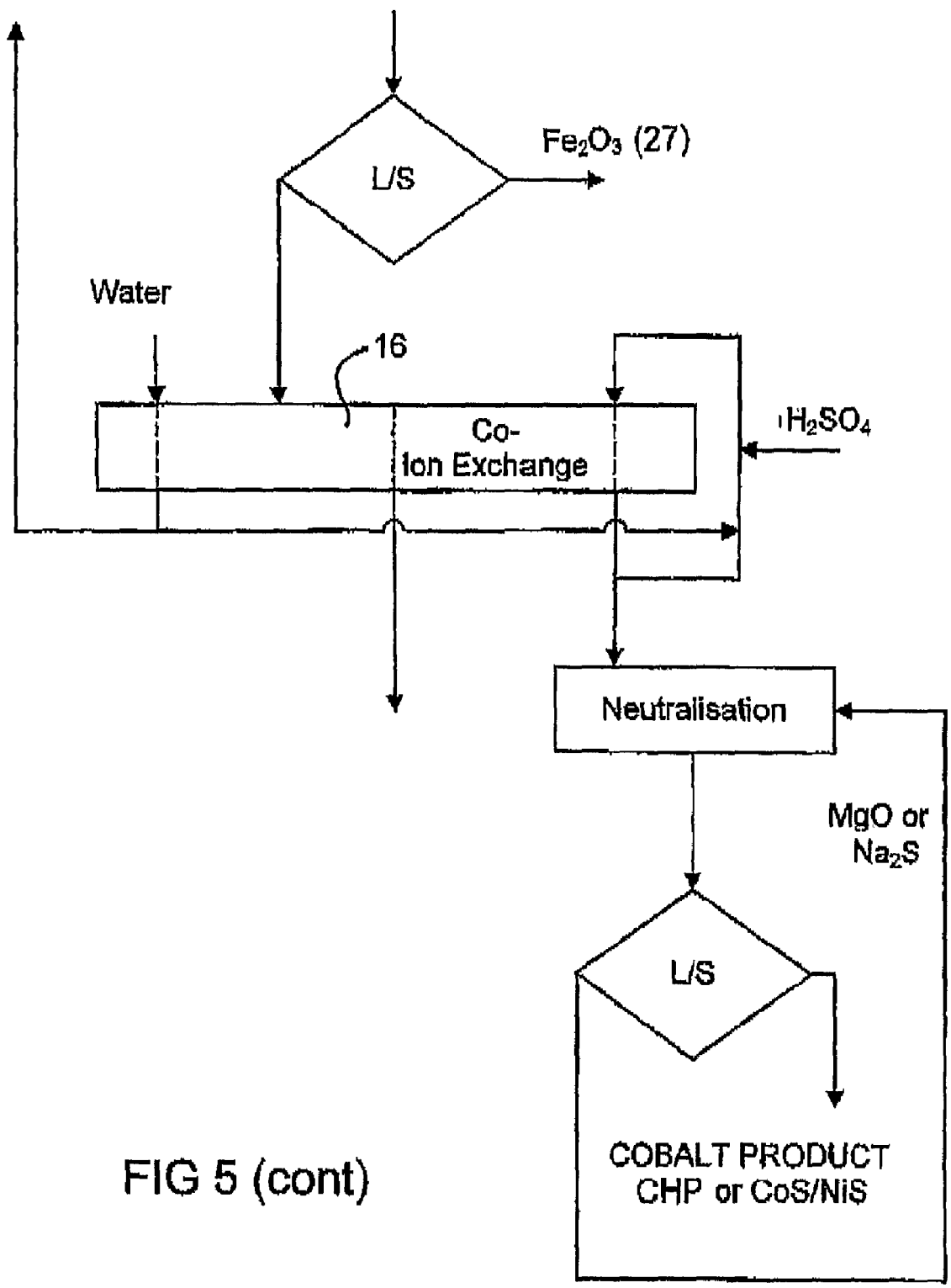

A further embodiment of the above use of the low pressure leach step applicable to the production of both ferro-nickel (illustrated) and nickel matte, is illustrated in FIG. 5, where the low pressure leach step (26) is applied to only the part of the ion exchange nickel depleted raffinate (9). Treating only part of the nickel depleted raffinate requires only a smaller autoclave for the smaller stream. The part of the nickel depleted raffinate that has been subjected to the LPAL step will be treated for cobalt recovery in an ion exchange step while the remainder is recycled to the liquid stream (1) for the heap leach process.

The discharge stream (29) from the LPAL process is also neutralised with calcium carbonate (30) to adjust the pH to around 2-3 so as to achieve an operational pH of from 2-3 for recovery of cobalt in the cobalt ion exchange process (16). This neutralisation step may be applied to the whole slurry containing the haematite prior to solid/liquid separation of the haematite (27) as part of the discharge from the LPAL step is not recycled to liquid stream (1) as it is in FIG. 4.

Figure 6:
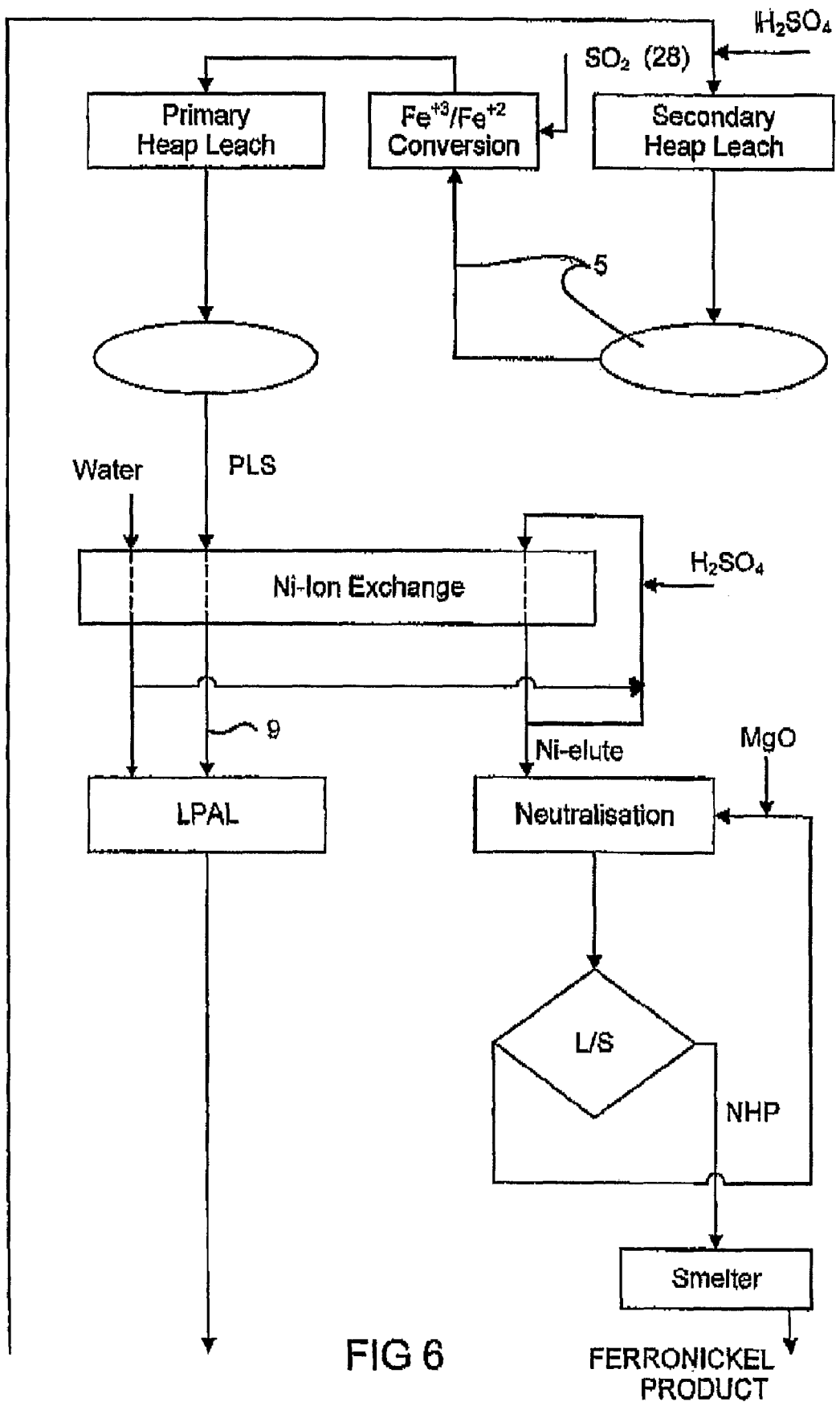
FIG. 6 illustrates the same process as FIG. 4 except that it also includes the addition of sulfur dioxide to convert ferric iron to ferrous iron in the leach step.
Figure 6:
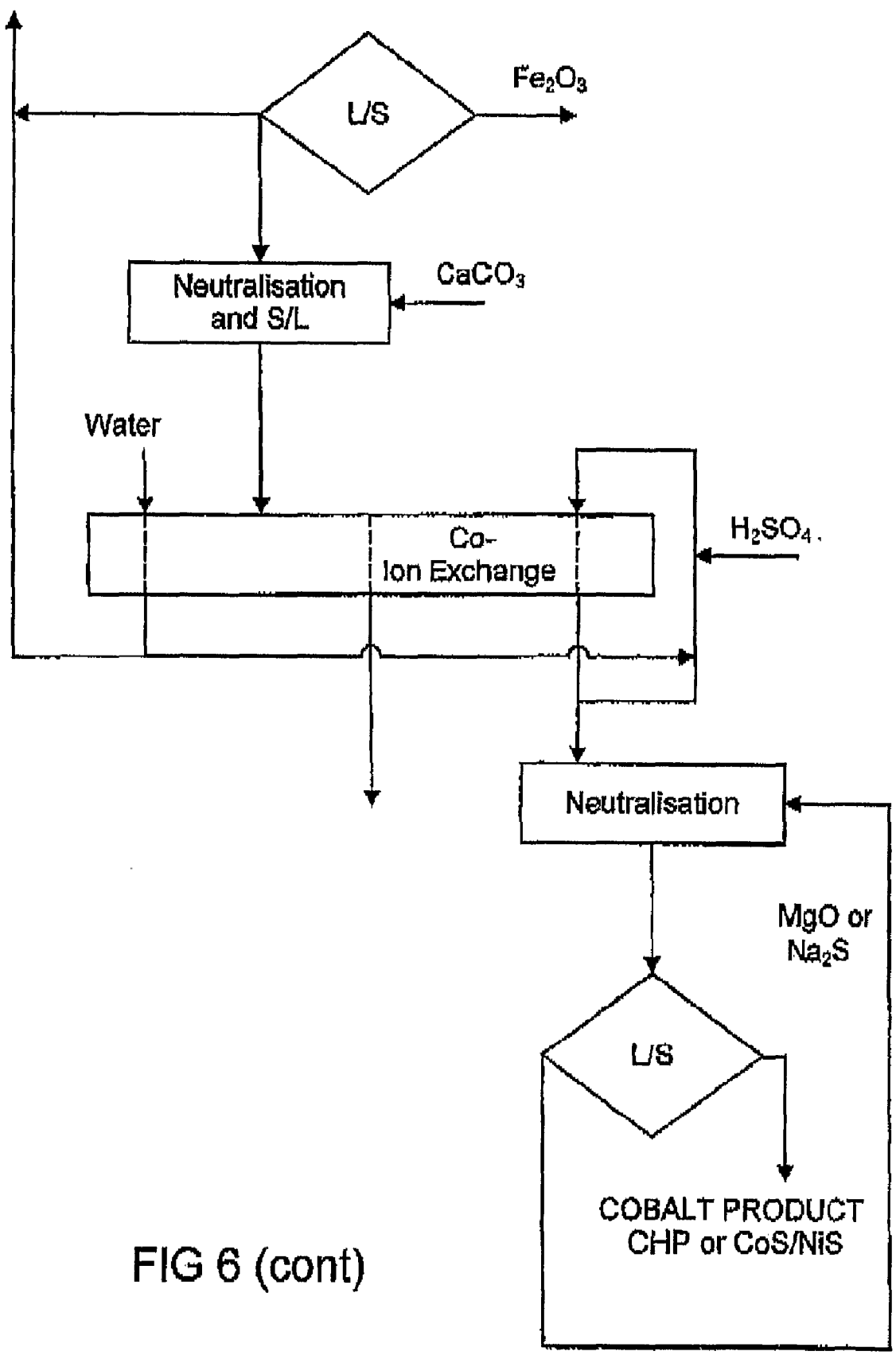
Figure 7:
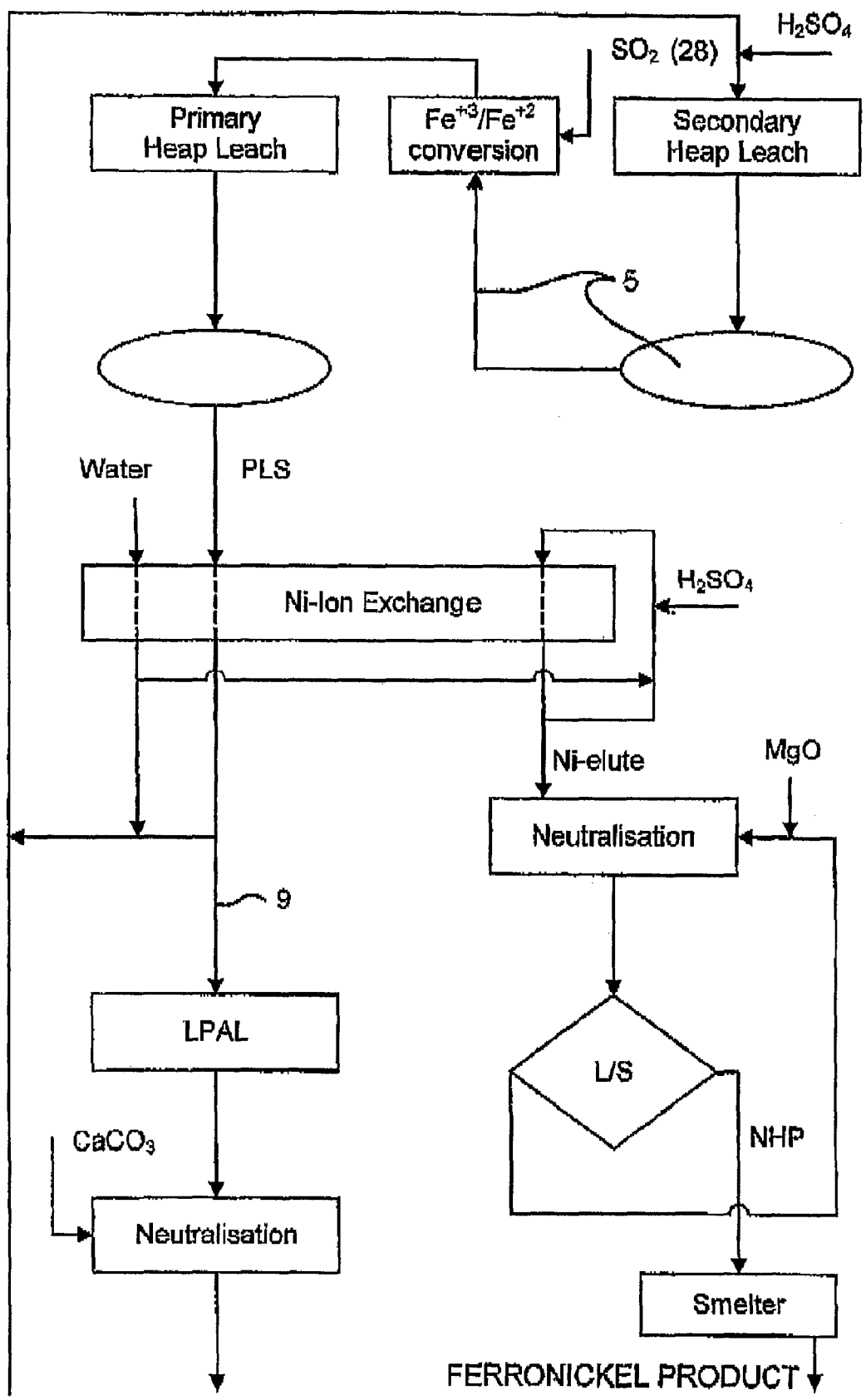
FIG. 7 illustrates the same process as FIG. 5 except that it also includes the addition of sulfur dioxide to convert ferric iron to ferrous iron in the leach step.
Figure 7:
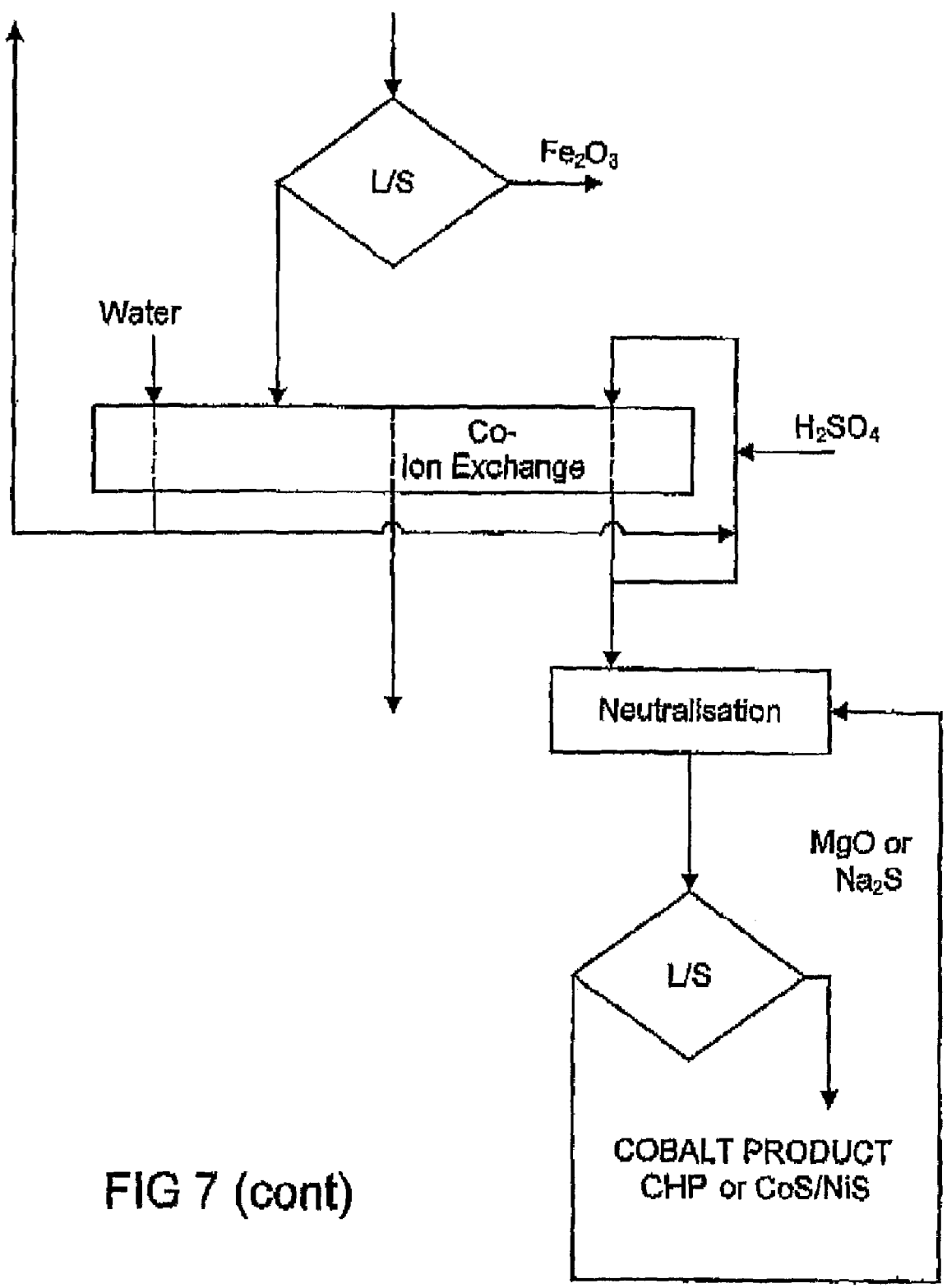

A further two embodiments of the invention (FIGS. 6 and 7), which are illustrated as applicable to the production of ferro-nickel but are also applicable in the production of nickel matte, involve the addition of sulfur dioxide (28) to the intermediate product liquor solution (5) for the embodiments which include the low pressure leach step treating all of the raffinate (9) from the nickel ion exchange step (FIG. 6) and part of the raffinate (9) (FIG. 7).

Each of the embodiments described in the figures illustrates various alternatives in the process and various combinations of the alternatives should be considered as forming part of the invention described herein.

An advantage of the process described is that it is suitable for lateritic ores that are not currently economic for processing by the conventional pyrometallurgical or hydrometallurgical routes described earlier. It has a major advantage over the conventional saprolite smelting process to produce ferro-nickel in that the quantity of nickel iron hydroxide product material to be smelted is approximately one fiftieth of the equivalent quantity of saprolite ore that would be required, with major associated power savings.

A second advantage of the new process over the conventional ferro-nickel smelting process is that the valuable metal cobalt is recovered separately for sale, whereas in saprolite smelting the cobalt becomes part of the ferro-nickel and its value is lost to the producer.

A further advantage of the process described is that, as a consequence of the high selectivity of the nickel ion exchange process step for nickel and iron, the impurity levels in the ferro-nickel produced are significantly lower than those currently achieved by the majority of commercial producers, and even those in the "super pure" ferro-nickel grade.

The process is also particularly attractive where large deposits of saprolite and/or limonite exist at an established saprolite mining and smelting operation producing ferro-nickel from the high grade ore. This process would allow treatment of the currently uneconomic grade ores which would normally be rejected to produce a mixed nickel iron hydroxide product feed for the existing smelter, reducing the unit power consumption per ton of nickel produced, producing cobalt for sale, and significantly improving the overall economics of the mining and processing the whole ore body.

The new process has a further advantage over the current hydrometallurgical routes, in that it has fewer process steps to convert ore to a finished metal product, ferro-nickel, and the preferred method of heap leaching is generally less capital intensive than other leach processes. Also, as a part of the iron content of the original ore becomes an ingredient of the final ferro-nickel product, the capacity of the plant required for iron removal is smaller than the iron removal sections of current hydrometallurgical routes.

It also has the flexibility that the mixed nickel iron hydroxide product suitable for feeding to a ferro-nickel smelter can be produced by the first parts of this process in plant located at the laterite ore body, and shipped cost effectively because of its high nickel content to a remote existing ferro-nickel smelter if the economics favour this. A similar strategy could be used if a nickel matte is required as the final product.

EXAMPLES

Example 1

Single Column Leaching with Sulfuric Acid Only

To simulate heap leaching with sulfuric acid only 65.6 kg saprolite ore with moisture content of 20.1% was agglomerated with 98% sulfuric acid to pelletise the material with particle size of 3.35 mm to 25.4 mm. The acid dose for agglomeration was 20 kg per tonne of dry ore. The column size was 15 cm diameter×262 cm height. Sulfuric acid solution with acidity of 50 g/L was fed to column with the flux of 40 Litre/(hr.m$^2$). The nickel extraction was 94% after 52 days. Table 1 summarizes the results.

TABLE 1

Column Leaching Results with Sulfuric Acid only

| | Weight kg | Al % | Co % | Cr % | Fe % | Mg % | Mn % | Ni % |
|---|---|---|---|---|---|---|---|---|
| Feed ore | 52.5 | 0.812 | 0.033 | 0.53 | 11.0 | 16.0 | 0.174 | 2.21 |
| Residue | 30.3 | 0.920 | 0.000 | 0.68 | 4.77 | 5.58 | 0.04 | 0.24 |
| Extraction % | | 34.61 | 100 | 25.96 | 74.97 | 79.87 | 86.73 | 93.73 |

Example 2

Single Column Leaching Fed with a Limonite Acid Leachate

To simulate heap leaching with acidic, nickel and cobalt containing solution e.g. pressure leaching or atmospheric leaching product liquor solution, 80.4 kg saprolite ore with moisture of 24.0% was agglomerated with 98% sulfuric acid to make the pellets with particle size of 3.35 mm to 25.4 mm. The acid dose for agglomeration was 25 kg per tonne of dry ore. The column size was 15 cm diameter×386 cm height. The acidic leachate from a limonite pressure leach containing nickel, cobalt and iron in solution, was fed to the column with a flux of 10 Litre/(hr.m$^2$). The composition of this feed solution is shown in Table 2. The nickel extraction was 76% at 197 days. Table 3 summarizes the results.

TABLE 2

Composition of limonite acid leachate

| Acidity g/L | Al mg/L | Co mg/L | Cr(VI) mg/L | Fe mg/L | Mg mg/L | Mn mg/L | Ni mg/L |
|---|---|---|---|---|---|---|---|
| 30-40 | 4550 | 730 | 350 | 3450 | 4750 | 3990 | 8550 |

TABLE 3

Column Leaching Results with Acidic leachate

| | Weight kg | Al % | Co % | Cr % | Fe % | Mg % | Mn % | Ni % |
|---|---|---|---|---|---|---|---|---|
| Feed ore | 61.1 | 1.61 | 0.055 | 0.88 | 17.2 | 10.8 | 0.388 | 1.8 |
| Residue | 41.0 | 1.71 | 0.005 | 1.04 | 13.6 | 5.0 | 0.410 | 0.63 |
| Extraction % | | 28.56 | 38.85 | 20.01 | 46.81 | 68.86 | 28.92 | 76.46 |

Examples 3

Counter-current Leaching

In order to simulate the counter current leaching process, a group of counter-current column leaches were carried out with a constant acid consumption of 670 kg $H_2SO_4$/t ore. The group contains five columns named as A, B, C, D and E. Column A was firstly fed with acidic intermediate product liquor solution (IPLS) obtained from previous column leaching (simulating the secondary leach effluent liquor) to simulate primary leaching, then fed with blank sulfuric solution of 100 g/l $H_2SO_4$ to simulate secondary leaching, and finally rinsed with pH 2 dilute $H_2SO_4$ solution. The product liquor solution (PLS) from the primary leaching was stored for nickel recovery with ion exchange. The IPLS from the secondary leaching and rinsing was used as feed solution to column B as primary leaching and so-on. Only the results of column B, C, D and E are quoted because these columns had the same initial conditions. The operation time of each column was about 30 days.

26 kg saprolite ore with a moisture content of 23.1% was agglomerated with 98% sulfuric acid to make pellets with particle size of 3.35 mm to 25.4 mm. The acid dose for agglomeration was 25 kg per tonne of dry ore. The column size was 10 cm diameter×305 cm height. The feed flux was 40 Litre/(hr.m$^2$). The nickel extraction was over 80%. The composition of feed ore is shown in Table 4. The extraction of Ni, Fe and Mg were calculated with three different methods and are shown in Table 5. The composition from the primary leaching (Table 6) indicated that this product liquor solution contained low acid levels and entrained solid and can be directly fed to ion exchange step for nickel recovery.

TABLE 4

Composition (%) of the Ore Charged to Column

| ID | Al | Ca | Co | Cr | Cu | Fe | Mg | Mn | Ni | Pb | S | Si | Ti | Zn |
|---|---|---|---|---|---|---|---|---|---|---|---|---|---|---|
| 670A | 1.07 | 0 | 0.04 | 0.66 | 0 | 11.9 | 16.5 | 0.20 | 2.23 | 0.01 | 0 | 23.7 | 0.00 | 0.04 |
| 670B | 0.97 | 0 | 0.04 | 0.63 | 0 | 11.6 | 15.9 | 0.19 | 2.06 | 0.01 | 0 | 22.8 | 0.00 | 0.03 |
| 670C | 0.94 | 0 | 0.04 | 0.60 | 0 | 10.9 | 14.7 | 0.19 | 2.14 | 0.01 | 0 | 21.0 | 0.03 | 0.03 |
| 670D | 1.00 | 0 | 0.04 | 0.63 | 0 | 11.7 | 16.4 | 0.19 | 2.07 | 0.01 | 0 | 23.2 | 0.00 | 0.03 |
| 670E | 1.04 | 0 | 0.04 | 0.63 | 0 | 11.5 | 15.9 | 0.20 | 2.21 | 0.01 | 0 | 22.5 | 0.00 | 0.03 |

TABLE 5

Results of Counter-current Column Leaching
(Acid Consumption: 670 kg/t ore)

| | Acid Consumption | | Ni extraction % | | | Fe extraction % | | | Mg extraction % | | |
|---|---|---|---|---|---|---|---|---|---|---|---|
| | kg/t | kg/kg | | | | | | | | | |
| I.D | ore | Ni[3] | L/H[1] | L/T[2] | T/H[3] | L/H[1] | L/T[2] | T/H[3] | L/H[1] | L/T[2] | T/H[3] |
| 670B | 645 | 39 | 87.9 | 82.1 | 80.8 | 45.5 | 48.1 | 50.9 | 69.1 | 60.5 | 54.9 |
| 670C | 601 | 35 | 85.5 | 81.1 | 80.1 | 44.4 | 46.7 | 49.3 | 57.4 | 58.0 | 58.4 |
| 670D | 608 | 36 | 88.6 | 82.8 | 81.6 | 44.4 | 45.2 | 46.2 | 62.9 | 60.6 | 59.1 |
| 670E | 649 | 38 | 85.3 | 84.4 | 84.2 | 47.5 | 53.7 | 59.0 | 64.7 | 63.8 | 63.4 |
| Ave. | 626 | 37 | 86.8 | 82.6 | 81.7 | 45.5 | 48.4 | 48.4 | 63.5 | 60.7 | 58.9 |

[1]Calculated using PLS and ore analysis
[2]Calculated using PLS and tailings analysis
[3]Calculated using tailing and ore analysis

TABLE 6

Major Content of the Final PLS

| Column ID | Vol. liter | pH | $H_2SO_4$ g/L | Ni g/L | Mg g/L | Fe g/L | Solid Conc. mg/L |
|---|---|---|---|---|---|---|---|
| 670B | 143 | 2.3 | 0 | 2.04 | 11.47 | 7.10 | 5 |
| 670C | 141 | 2.2 | 0 | 2.79 | 14.95 | 8.11 | 11 |
| 670D | 141 | 2.0 | 1.5 | 2.80 | 15.10 | 7.60 | 18 |
| 670E | 139 | 1.5 | 3.1 | 2.60 | 14.70 | 7.80 | 14 |

Example 4

Nickel Recovery with Ion Exchange

Product liquor solution obtained from counter-current column heap leaching of rocky saprolite was processed through a 250 mL resin column of Dowex M4195 resin at a flow rate of 25 mL/min. Nickel and some iron are loaded onto the resin, separating them from other impurities and the remaining iron which pass through in the raffinate. The nickel and iron-containing eluate was obtained with stripping the ion exchange column with 150 g/L $H_2SO_4$. Table 7 illustrates the composition of feed, raffinate and Ni-eluate. The ratio of nickel to iron achieved in the eluate is suitable to achieve a good feed material for ferro-nickel production.

TABLE 7

Composition of ion exchange Feed, Raffinate and Eluate

| Liquid Stream | Al mg/L | Co mg/L | Cr mg/L | Fe mg/L | Mg mg/L | Mn mg/L | Ni mg/L |
|---|---|---|---|---|---|---|---|
| Feed | 234 | 52 | 127 | 12137 | 16221 | 303 | 2887 |
| Raffinate | 229 | 27 | 113 | 5869 | 15415 | 289 | 61 |
| Ni-eluate | 0 | 30 | 7 | 9956 | 7 | 1 | 5609 |

Example 5

Nickel Recovery with Counter-current Ion Exchange

30 Litres of heap leaching product liquor solution was neutralized with limestone to pH 2. After solid/liquid separation, the product liquor solution was treated with ion exchange columns filled with Dowex M4195 resin for nickel recovery and impurity separation with a counter-current style operation. The bed volume of resin was 2 litres. Four bed volume (8 litre) of product liquor solution were fed to column to create an intermediate raffinate. The intermediate raffinate was neutralized with limestone to pH 2 and then fed to secondary column to create the final raffinate for cobalt recovery. Directly after feeding the neutralized intermediate raffinate, another four bed volume (8 litre) product liquor solution was fed to the same ion exchange column to create the intermediate raffinate and so on. The fully loaded ion exchange column was then consecutively rinsed with 2 bed volume water, stripped with 1 bed volume 150 g/L or 200 g/L $H_2SO_4$ and rinsed with 2 bed volume water. Approximately a half bed volume of eluate that contained high concentration nickel and low concentration acid was collected as product for making ferro-nickel. Approximately one bed volume eluate that contained low concentration nickel and high concentration acid was collected for making stripping solution for next ion exchange cycle with acidification. Table 8 illustrates the average concentration of feed, intermediate raffinate, final raffinate and nickel-eluate (product).

TABLE 8

Composition of Liquid Streams with Counter-current ion exchange operation

| Liquid Stream | Al mg/L | Co mg/L | Cr mg/L | Fe mg/L | Mg mg/L | Mn mg/L | Ni mg/L |
|---|---|---|---|---|---|---|---|
| Feed | 1625 | 205 | 188 | 16350 | 2350 | 1175 | 2130 |
| Final raffinate (feed to Co-IX) | 1300 | 68 | 150 | 5800 | 1900 | 950 | 92 |
| Ni-eluate | 0 | 260 | 7 | 22000 | 0 | 0 | 9200 |

Example 6

Effect of $Fe^{+3}/Fe^{+2}$ Conversion on Ion Exchange

Figure 8:
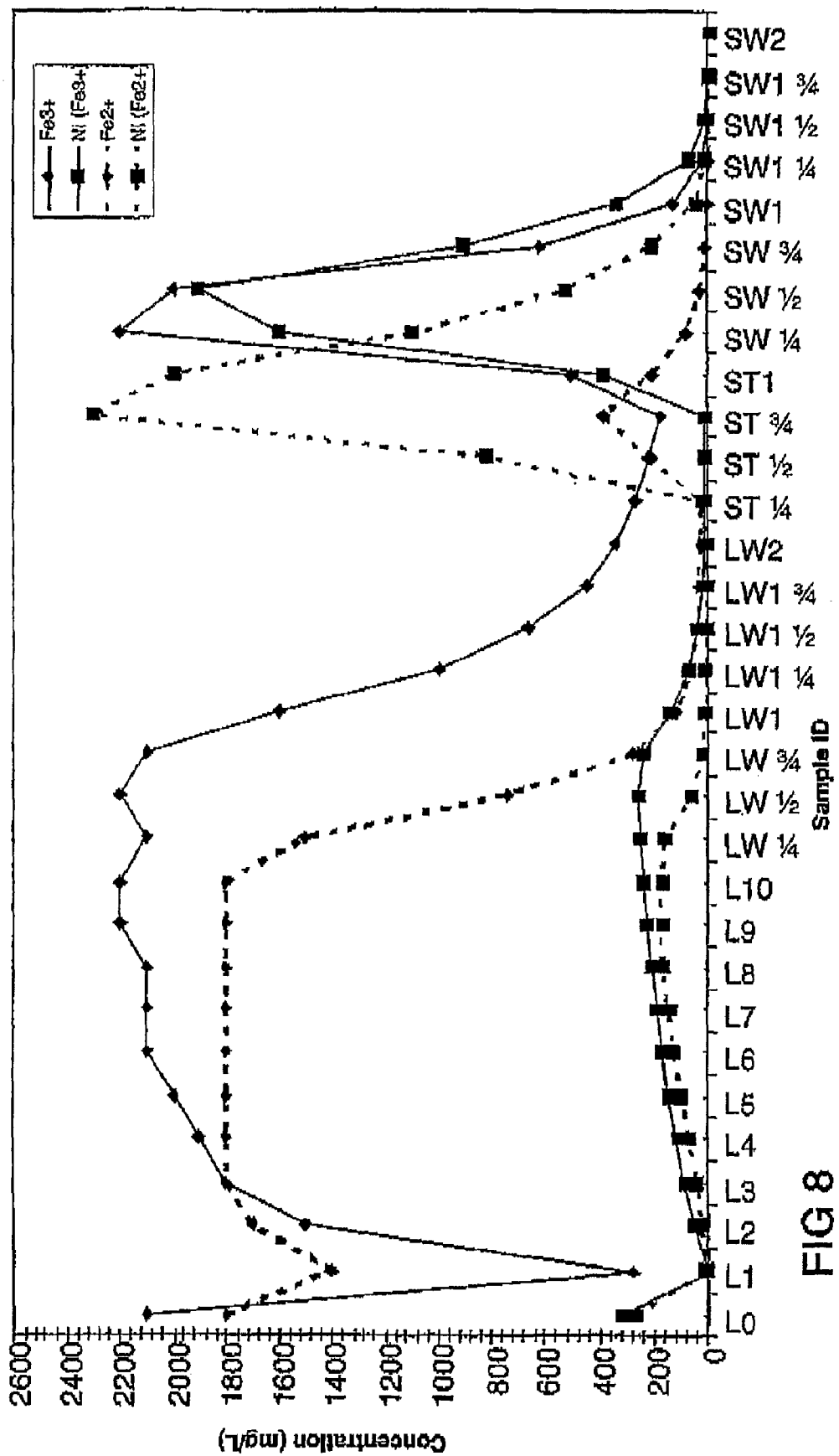
FIG. 8 illustrates the concentration profiles of iron and nickel with and without $Fe^{3+}/Fe^{2+}$ conversion.

The column leaching product liquor solution was treated with sparged sulfur dioxide gas or adding sodium metabisulfite to convert all ferric ions to ferrous ions, as Dowex M4195 resin had less selectivity to ferrous ions than ferric ions. The iron content in the nickel eluate was decreased by 80%. FIG. 8 shows the concentration profiles of iron and nickel with and without $Fe^{+3}/Fe^{+2}$ conversion.

In FIG. 8, the labels on the x axis are described as follows:
L is the resin loading stage.
LW is the load wash with water stage
ST is the resin strip with acid stage
SW is the stripping wash with water stage The number after each character describes the number of bed volumes of liquor that had passed through the bed at the time the sample was taken.

Example 7

Production of Nickel Iron Hydroxide Product and Ferro-nickel

Figure 9:
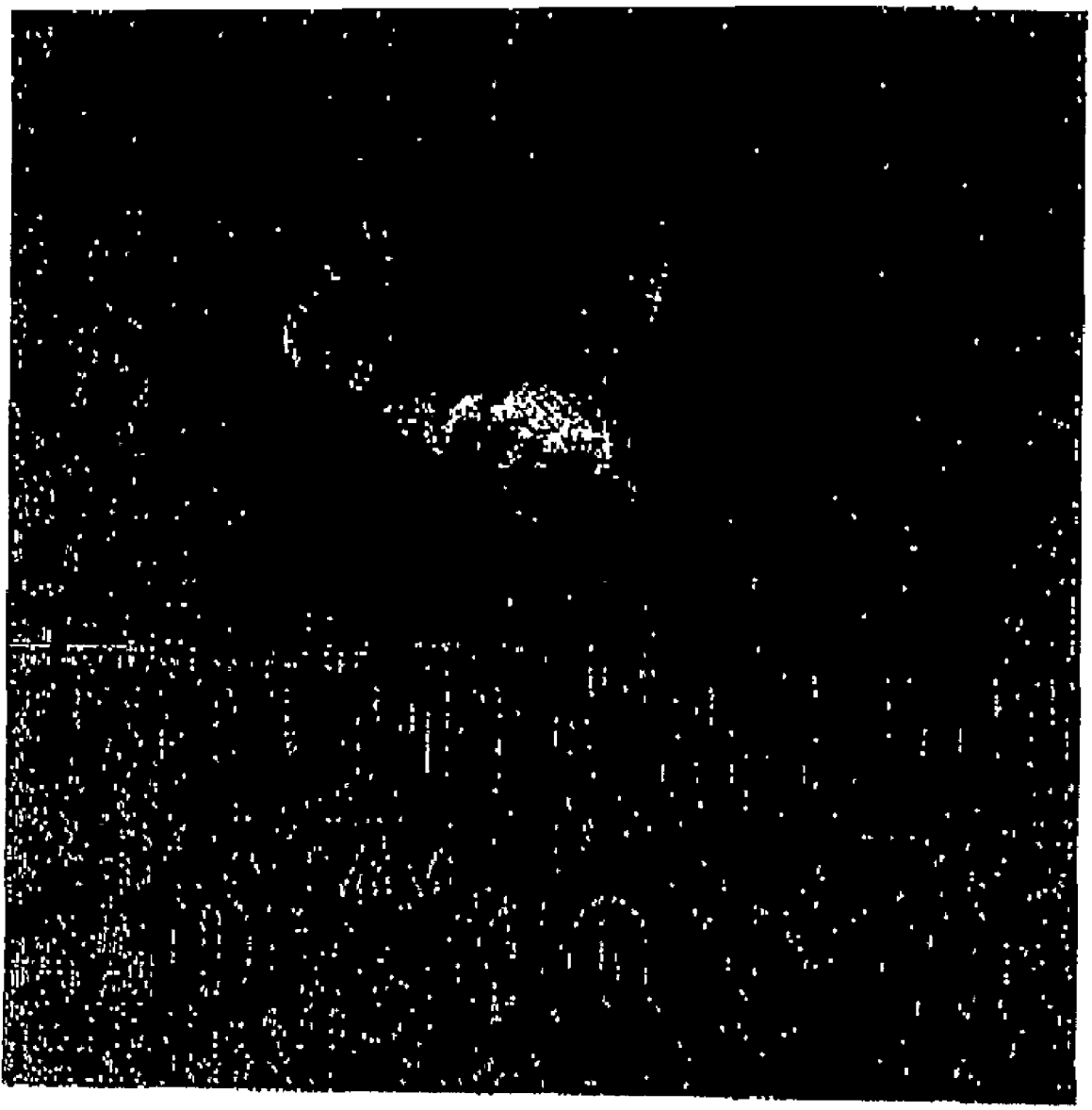
FIG. 9 illustrates a ferro-nickel nugget produced in accordance with the process of the invention.

The ion exchange Ni-eluate was neutralized with MgO at pH 9-14 to precipitate iron and nickel as a mixed nickel iron hydroxide product (MHP). The dried nickel iron hydroxide product was mixed with carbon and slag-making materials and smelted in furnace at around 1575° C. to make ferro-nickel. Table 9 summarises the composition of Ni-eluate, barren solution after neutralization, nickel iron hydroxide product and ferro-nickel. FIG. 9 shows the ferro-nickel nugget produced. This example demonstrates that ferro-nickel can be produced from the process described in the invention.

TABLE 9

Composition of ion exchange Ni-elute, Barren Solution nickel iron hydroxide product and Ferro-Nickel

| | Al | C | Co | Cr | Fe | Mg | Mn | Ni | S |
|---|---|---|---|---|---|---|---|---|---|
| Ni-Eluate mg/L | 0 | 0 | 260 | 7 | 22000 | 0 | 0 | 9200 | 43000 |

TABLE 9-continued

Composition of ion exchange Ni-elute, Barren Solution nickel iron hydroxide product and Ferro-Nickel

|  | Al | C | Co | Cr | Fe | Mg | Mn | Ni | S |
|---|---|---|---|---|---|---|---|---|---|
| Barren Soln. mg/L | 0 | 0 | 0 | 0 | 0 | 18000 | 0 | 1 | 24000 |
| MHP % | 0.01 | 0 | 0.16 | 0 | 14.7 | 20.5 | 0 | 6.2 | 2.4 |
| Ferro-nickel % | <0.01 | <0.01 | <0.01 | <0.01 | 68.07 | <0.01 | <0.01 | 31.55 | <0.01 |

Example 8

Iron Precipitation as Goethite with Ni-IX Raffinate

The excess iron removal step in preparation for cobalt recovery is illustrated in this example. Due to high Fe/Ni and Fe/Co concentration ratio, the raffinate from the nickel ion exchange step is pre-treated with goethite precipitation before feeding to a cobalt ion exchange step. The raffinate was heated to 800 to 900° C. and neutralized with limestone at pH2. The solution and solid assay indicated there was no Ni and Co loss during this treatment. Table 10 illustrates the liquid and solid compositions.

TABLE 10

Liquid and Solid Composition during Goethite Precipitation

|  | Al | Co | Cr | Fe | Mg | Mn | Ni |
|---|---|---|---|---|---|---|---|
| Liquid feed mg/L | 1300 | 68 | 150 | 5800 | 1900 | 950 | 92 |
| Filtrate mg/L | 980 | 59 | 32 | 70 | 2167 | 927 | 92 |
| Filter cake % | 0.83 | 0 | 0.25 | 13.1 | 0.03 | 0.01 | 0 |

Example 9

Cobalt Recovery with Ion Exchange

A solution obtained from goethite precipitation at pH2 as described in example 8 was processed through a 250 mL resin column of Dowex M4195 resin at a flow rate of 25 mL/min. Both cobalt and residual nickel were loaded onto the resin, the other impurities were expelled to the raffinate. The cobalt/nickel containing eluate was obtained with stripping the ion exchange column with 150 g/L $H_2SO_4$. Table 11 illustrates the composition of feed, raffinate and Co/Ni-eluate.

TABLE 11

Composition of ion exchange Feed, Raffinate and Elute

| Liquid Stream | Al mg/L | Co mg/L | Cr mg/L | Fe mg/L | Mg mg/L | Mn mg/L | Ni mg/L |
|---|---|---|---|---|---|---|---|
| Feed | 350 | 180 | 3.6 | 23 | 2400 | 1100 | 1300 |
| Raffinate | 322 | 12 | 3.0 | 23 | 2200 | 1006 | 1 |
| Co-eluate | 0 | 2000 | 0 | 30 | 0 | 0 | 14000 |

The above description is intended to be illustrative of the preferred embodiment of the present invention. It should be understood by those skilled in the art, that many variations or alterations may be made without departing from the spirit of the invention.

The invention claimed is:

1. A process for the production of ferro-nickel or nickel matte from a product liquor solution containing at least nickel, cobalt, iron and acid soluble impurities, said process including the steps of:

(a) contacting the product liquor solution containing the nickel, cobalt, iron and acid soluble impurities with an ion exchange resin, wherein the resin selectively absorbs nickel and iron from the solution leaving the cobalt and the acid soluble impurities in a raffinate;

(b) stripping the nickel and iron from the resin with a sulfuric acid solution to produce an eluate containing nickel and iron;

(c) neutralising the eluate to precipitate a mixed nickel iron hydroxide product; and (d) reducing and smelting the mixed nickel iron hydroxide product to produce ferro-nickel or nickel matte.

2. A process according to claim 1 wherein the product liquor solution containing the nickel, cobalt, iron and acid soluble impurities has a pH of from about 1.0 to 2.5 for selective absorption of nickel and ferric iron when in contact with the ion exchange resin.

3. A process according to claim 1 wherein the ratio of nickel to iron in the eluate is from 0.5:4 to 4:0.5.

4. A process according to claim 1 wherein the eluate is neutralised by the addition of magnesium carbonate and/or magnesium oxide.

5. A process according to claim 1 wherein the mixed nickel iron hydroxide product is reduced, and processed in an electric arc furnace for smelting to a ferro-nickel product.

6. A process according to claim 1 wherein a sulfur source is added to the mixed nickel iron hydroxide product and the mixture is smelted to produce a nickel matte.

7. A process according to claim 1 wherein the raffinate containing the cobalt and acid soluble impurities, is contacted with an ion exchange resin to selectively absorb the cobalt leaving the acid soluble impurities in a cobalt depleted raffinate.

8. A process according to claim 7 wherein the pH of the raffinate is adjusted to be about 2-3 when in contact with the ion exchange resin for selective absorption of cobalt.

9. A process according to claim 8 wherein the raffinate is partially neutralised to precipitate any ferric iron remaining in the raffinate as goethite haematite and/or hydroxides prior to contact with the ion exchange resin.

10. A process according to claim 9 wherein the raffinate is neutralised by the addition of calcium carbonate.

11. A process according to claim 7 wherein the cobalt is eluted from the ion exchange resin with sulfuric acid to produce an eluate containing the cobalt.

12. A process according to claim 11 wherein the cobalt is recovered from the eluate by either neutralising the eluate to precipitate the cobalt as a cobalt hydroxide or sulfiding the eluate to precipitate a cobalt sulfide product.

13. A process according to claim 12 wherein the cobalt is precipitated as cobalt hydroxide by the addition of magnesium oxide.

14. A process according to claim 12 wherein the cobalt is precipitated as cobalt sulfide by the addition of a sodium sulfide solution.

15. A process according to claim 1 wherein the resin is a resin with a functional group of bis-picolylamine.

16. A process according to claim 15 wherein the resin is Dowex M4195.

17. A process according to claim 1 wherein the product liquor solution is produced by an acid heap leach process of laterite ore.

18. A process according to claim 17 wherein the heap leach process is established in a counter current system whereby:
  (a) a primary and a secondary heap are established;
  (b) the secondary heap is treated with a liquor stream comprising recycled raffinate supplemented by sulfuric acid to produce an intermediate product liquor solution; and
  (c) treating the primary heap with the intermediate product liquor solution to produce the product liquor solution containing nickel, cobalt, iron and acid soluble impurities.

19. A process according to claim 18 wherein the ore is first crushed and agglomerated using water, sulfuric acid or other binding materials to improve heap permeability.

20. A process according to claim 19 wherein the ore is crushed to a size of less than 25 mm.

21. A process according to claim 18 wherein the recycled raffinate is nickel depleted raffinate from the nickel/iron ion exchange step and/or the cobalt depleted raffinate from the cobalt ion exchange step.

22. A process according to claim 18 wherein the secondary heap is discarded when it is substantially depleted of nickel, the primary heap becomes the secondary heap, and a new laterite ore heap becomes the primary heap.

23. A process according to claim 18 wherein the liquor stream treating the secondary heap is also supplemented with the leachate containing at least nickel, cobalt and iron from a pressure acid leach process or an atmospheric leach process of a laterite ore, or from the leachate of an oxidative leach process of a nickel sulfide ore.

24. A process according to claim 19 wherein the raffinate from the nickel/iron ion exchange step is subjected to a low pressure leach step at approximately 160° C. to 200° C. in an autoclave to precipitate iron as haematite and to release some acid to the liquor stream.

25. A process according to claim 24 wherein a low pressure acid leach step is applied to only part of the raffinate requiring a smaller autoclave while the remainder of the raffinate is recycled directly to the secondary heap leach step.

26. A process according to claim 18 wherein sulfur dioxide is added to the recycled raffinate and/or to the intermediate product liquor solution to convert ferric iron in the solution to ferrous iron.

27. A process according to claim 1 wherein the product liquor solution is produced by leaching laterite nickel ore with sulfuric acid by a pressure acid leach process, an atmospheric pressure leach process, or any combination of pressure and atmospheric pressure leaching followed by partial neutralisation to adjust the pH of the product liquor solution to about 1.0 to 2.5.

28. A process according to claim 1 wherein the product liquor solution is produced by the oxidative leaching of nickel sulfide ore followed by partial neutralisation to adjust the pH of the product liquor solution to about 1.0 to 2.5.

29. A process for the recovery of nickel as ferro-nickel or nickel matte, and cobalt as a hydroxide or sulfide product, from a laterite ore comprising the steps of:
  (a) subjecting the ore to an acid heap leach process to recover a product liquor solution containing at least nickel, cobalt, iron and acid soluble impurities;
  (b) contacting the product liquor solution to an ion exchange resin at a pH of from about 1.0 to 2.5 wherein the resin selectively absorbs nickel and iron from the solution leaving the cobalt and acid soluble impurities in a raffinate;
  (c) stripping the nickel and iron from the resin with a sulfuric acid solution to produce an eluate containing the nickel and iron;
  (d) neutralising the eluate containing the nickel and iron to precipitate a mixed nickel iron hydroxide intermediate product;
  (e) reducing and smelting the mixed nickel and iron hydroxide intermediate product to produce ferro-nickel or nickel matte;
  (f) partially neutralising the raffinate containing the cobalt and acid soluble impurities to precipitate ferric iron ions as goethite, haematite or hydroxides;
  (g) contacting the partially neutralised raffinate containing the cobalt and acid soluble impurities to an ion exchange resin at a pH of from about 2.0 to 3.0 to selectively absorb the cobalt;
  (h) eluting the cobalt from the cobalt ion exchange resin with sulfuric acid to produce an eluate containing the cobalt; and
  (i) neutralising the eluate containing the cobalt to precipitate the cobalt as a cobalt hydroxide or a cobalt sulfide product.

30. A process according to claim 29 wherein the heap leach process is established in a counter current whereby:
  (a) a primary and secondary heap are established;
  (b) the secondary heap is treated with a liquor stream comprising recycled raffinate supplemented by a sulfuric acid to produce an intermediate product liquor solution; and
  (c) treating the primary heap with the intermediate product liquor solution to produce the product liquor solution containing nickel, cobalt, iron and acid soluble impurities.

31. A process according to claim 30 wherein the secondary heap is discarded when it is substantially depleted of nickel, the primary heap becomes the secondary heap, and a new laterite ore heap becomes the primary heap.

* * * * *